Jan. 3, 1967   A. WAHL   3,295,784
MOUNTINGS FOR REELED STRIP MATERIAL
Filed Jan. 29, 1964   3 Sheets-Sheet 1

INVENTOR
Adolf Wahl

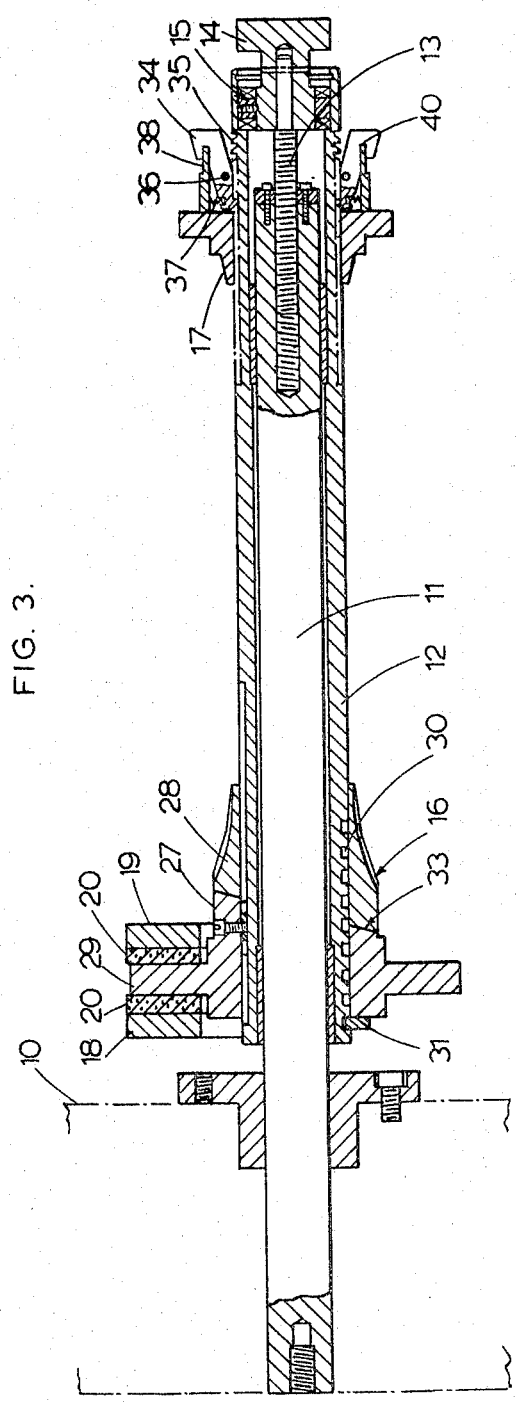

United States Patent Office 3,295,784
Patented Jan. 3, 1967

3,295,784
MOUNTINGS FOR REELED STRIP MATERIAL
Adolf Wahl, 4 Ennerdale Ave., Dunstable,
Bedfordshire, England
Filed Jan. 29, 1964, Ser. No. 340,973
Claims priority, application Great Britain, July 10, 1963,
27,352/63
4 Claims. (Cl. 242—68.3)

This invention relates to mountings for cored reels of continuous strip material. Such mountings are used on machines in which the strip material is drawn off from the reels for the production of articles from the material, or for covering articles with paper, cardboard or metal foil, or for wrapping or shaping containers and the like from continuous strip material.

It is an object of the present invention to provide a mounting affording a quick replacement of reels and also a required tension in the unreeled strip material. The term "strip material" also includes wire, tape, cord and the like.

An embodiment of the invention will now be described, by way of example, with reference to the accompanying drawings in which:

FIGURE 3 is a section on the line III—III of FIGURE 2.

Figure 1:
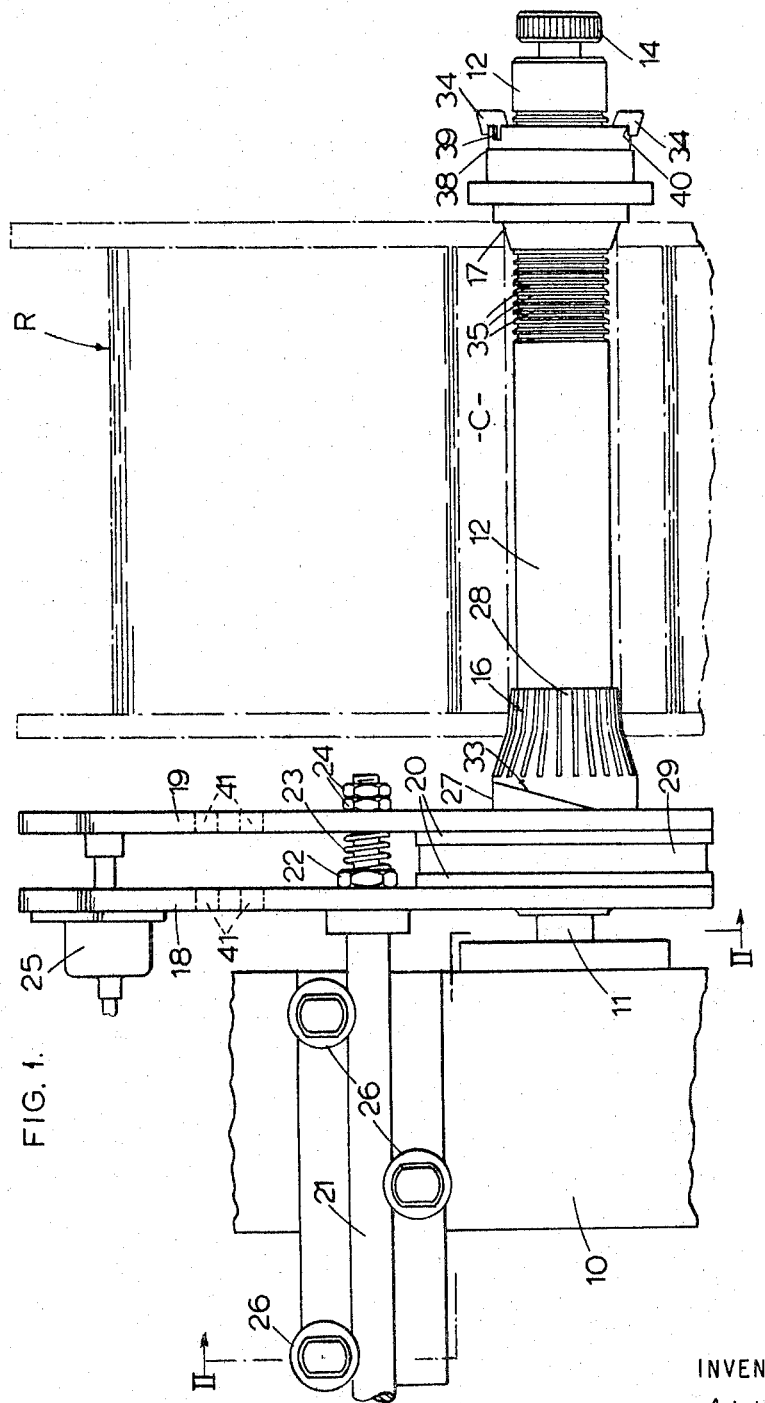
FIGURE 1 is a side elevation showing a mounting for a cored reel of paper strip.
Figure 2:
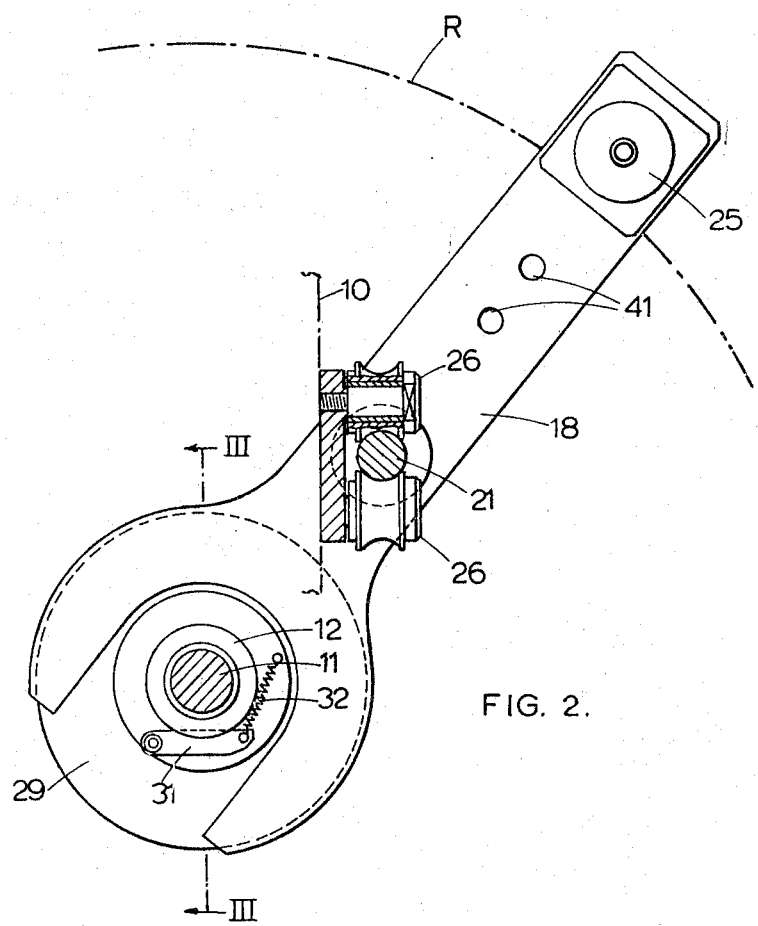
FIGURE 2 is a section on the line II—II of FIGURE 1.

Referring to the drawings, frame 10 of a machine for making paper serviettes carries a series of reel mountings, one of which is illustrated. The mounting includes a fixed supporting pin in the form of a horizontal cylindrical post 11 secured to the frame 10. A sleeve 12 is rotatably mounted on the post 11. The sleeve is axially positioned by means of an outer end bolt arrangement (FIG. 3) which includes a rotatable screwed stem 13 in engagement with the post 11 and provided with a milled nut 14. The nut 14 is journalled in a bearing 15 at the end of the sleeve. The bearing includes fibre friction washers to prevent accidental turning of the nut 14.

First and second collars 16 and 17 are mounted one at each end of the sleeve to carry a cored reel R of paper strip.

A friction brake device which comprises a pair of arms 18, 19 carrying brake pads 20 is located at the end of the sleeve adjacent the first collar 16 which is adjacent the machine frame 10. The brake device is mounted on the frame by means of a guide bar 21 which connects with the brake arms 18, 19. Supporting rollers 26 mounted on the machine frame 10 hold the bar 21 firmly in position but allow for axial adjustment as hereinafter described.

Arm 18 is secured to the bar 21 by nut 22 and arm 19 is pivotally held between compression spring 23 and nuts 24. Pivotal movement of arm 19 is effected by an air clamp 25 as hereinafter described.

The first collar 16 comprises two axial lengths or parts 27 and 28. The outer part 27 is keyed to the sleeve and is formed with a brake disc 29 which is sandwiched between the pads 20 of the friction brake device. The corresponding end part of the sleeve is formed with a series of, say, nine transverse slots 30 spaced apart by approximately one quarter inch. A lever 31, pivotally mounted on the part 27 and loaded by tension spring 32, is arranged to engage selectively in the slots 30. The inner collar part 28 is arranged to receive one end of the reel core C. The two collar parts are formed with angled inner ends at 33 which present wedge or swash faces whereby relative turning movement of the two parts will effect movement of the inner part 28 towards the second collar 17.

The second collar 17, which is located towards the free end of the support, is provided with a pair of diametrically opposed pawls 34 arranged for co-operation with ratchet teeth 35 which are formed as circumferential grooves in the sleeve 12. The pawls are pivotally mounted at their outer ends closely adjacent the ratchet surface, their pivotal axes 36 being at a minimum radial distance from the centre of the support. The pawls are urged by light springs 37 into engagement with the ratchet teeth 35 which are suitably angled to co-operate with the pawls.

The second collar 17 is provided with a shaped locking ring 38 which can be rotated, against friction, through a small angle to bring recesses 39 in ring 38 into and out of register with the pawls 34. The pawls are formed with slots 40 which can be entered by the ring 38 to lock the pawls in their engaged position.

In use of the mounting, the collar 17 is removed and the reel R placed on the sleeve. The collar 17 is then replaced and, if necessary, the collar 16 is moved so that the effective distance between the two collars corresponds approximately to the axial length of the reel core C. The collar 16 is locked in position by the lever 31 engaging one of the slots 30 in the sleeve 12, and it will be appreciated that this arrangement gives a rough adjustment of the relative positions of the collars and may reduce the necessary stretch of the ratchet teeth 35. The collar 17 is pressed towards the collar 16 to hold the reel core in position between the two collars, the spring-urged pawls operating automatically to hold the collar 17 in axial position, and the ring 38 is then turned to lock the pawls.

When turning of the reel commences due to unwinding of the paper strip, the inner part 28 of the collar 16 turns relatively to the braked part 27 and, due to the swash action of the abutting ends 33 the inner part is forced towards the collar 17 to hold the reel core C firmly in position, much more firmly, in fact, than could be effected by pushing the collar 17 home manually.

During rotation of the reel, the brake disc 28 on collar part 26 is engaged by the brake pads which are urged together by the air clamp 25 acting between the arms 18 and 19. This imparts the required yielding resistance to rotation of the reel R and so maintains a desired working tension in the strip material drawn from the reel. Holes 41 are provided to allow for alteration of the pivot point of arm 19 and so vary the sensitivity of the braking action produced by the air clamp.

During operation, the alignment of the reel can be adjusted by turning the milled nut 14 in the appropriate direction to move the supporting sleeve 12.

When the core of a spent reel is to be removed, the locking ring 38 is turned to free the pawls which are then operated, by finger pressure, to disengage from the ratchet teeth with which they are tightly engaged due to the action of the expanding collar 16. This disengaging operation is made easily possible as the turning movement of the pawls urges the pawl detents to separate from the abutting faces of the ratchet teeth: thus, locking of the pawls in the ratchet teeth is prevented. The disengagement can be further facilitated by relaxing said compression; this can be effected by turning the reel backwards to return the inner part of the first collar 16 to its outermost position.

I claim:
1. A mounting for a cored reel of continuous strip material, comprising support means, a first reel-supporting rotary collar mounted on said support means, a second reel-supporting rotary collar removably mounted on said support means and spaced apart from said first collar, means for preventing axial movement of said first collar, ratchet teeth on said support means, opposed pawls mounted on said second collar to engage with said ratchet teeth and so position said second collar to secure the core of the reel, pivotal mountings for the pawls located axially outwardly of the points of engagement between the pawls and said ratchet teeth to facilitate disengagement of the pawls and at a minimum radial distance from said support means and a shaped locking ring mounted on said second collar to move into and out of engagement with said pawls to effect locking and unlocking, respectively, of said pawls.

2. A mounting as claimed in claim 1, in which said support means comprises a fixed supporting pin, and a sleeve rotatably mounted on said pin, and adjustable connecting means are arranged between said pin and said sleeve to effect axial movement of the sleeve relative to said pin.

3. A mounting for a cored reel of continuous strip material, comprising support means, first and second reel-supporting rotary collars mounted on said support means and spaced apart to receive between them and support in an operative position the core of the reel, said first collar comprising an outer part and an inner part, means for preventing axial movement of said outer part, means to oppose rotation of said outer part, co-operating wedge faces on said two collar parts to effect axial movement of the inner collar part towards said second collar on relative rotation between the two parts, ratchet teeth on said support means, opposed pawls mounted on said second collar to engage with said ratchet teeth and so position said second collar to secure the core, and pivotal mountings for the pawls located axially outwardly of the points of engagement between the pawls and said ratchet teeth to facilitate disengagement of the pawls and at a minimum radial distance from said support means.

4. A mounting as claimed in claim 3, in which a brake disc is provided on said outer part of said first collar and brake means are provided to oppose rotation of said disc.

References Cited by the Examiner
UNITED STATES PATENTS

| | | | |
|---|---|---|---|
| 862,109 | 7/1907 | Roth | 242—68.4 |
| 907,761 | 12/1908 | Evenson | 242—68.4 |
| 1,235,457 | 7/1917 | Fouse et al. | 242—107.6 |
| 1,682,421 | 8/1928 | Rosenbaum | 242—100 |
| 2,405,446 | 8/1946 | Perrault | 242—68.3 X |

FRANK J. COHEN, *Primary Examiner.*

MERVIN STEIN *Examiner.*

N. L. MINTZ, *Assistant Examiner.*